May 31, 1966 J. S. WRIGHT 3,253,358
VISUAL TEACHING SYSTEM
Filed July 17, 1963 2 Sheets-Sheet 1
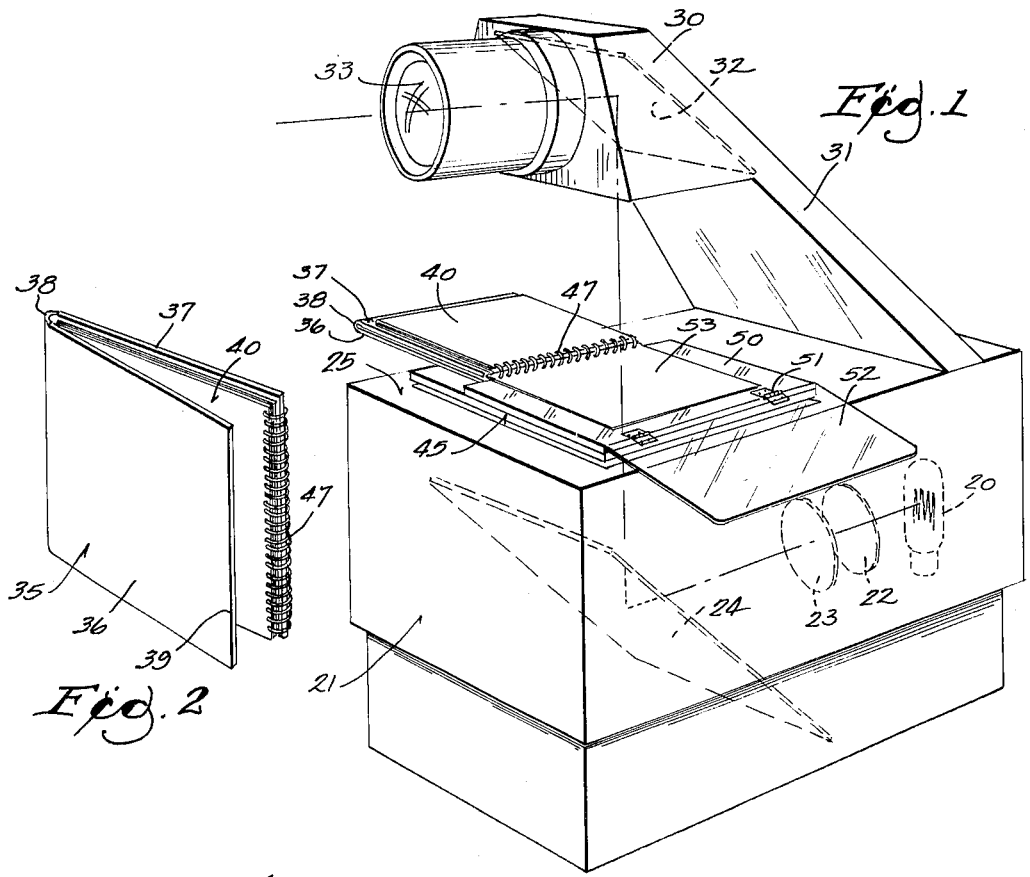
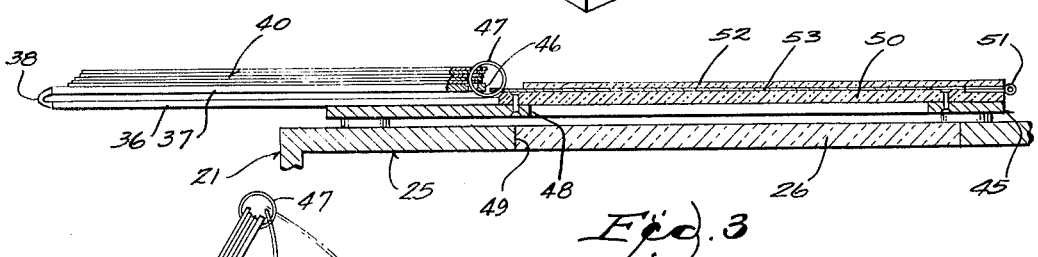
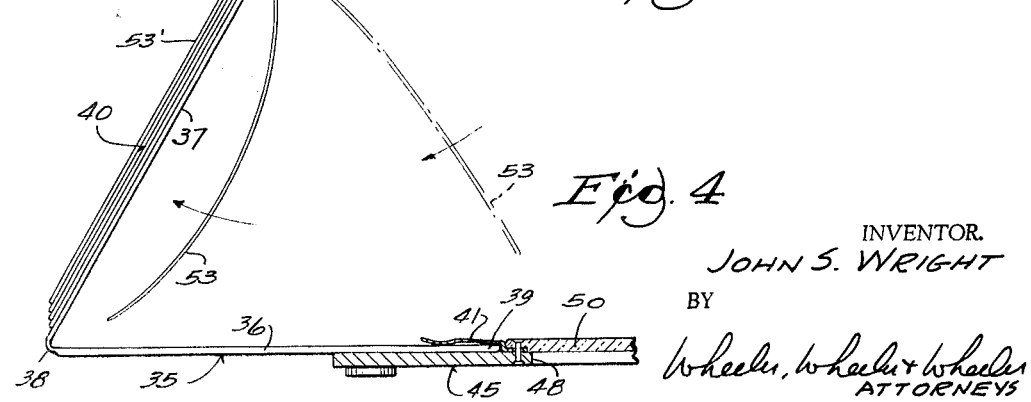
INVENTOR.
JOHN S. WRIGHT
BY
Wheeler, Wheeler & Wheeler
ATTORNEYS May 31, 1966  J. S. WRIGHT  3,253,358
VISUAL TEACHING SYSTEM
Filed July 17, 1963  2 Sheets-Sheet 2
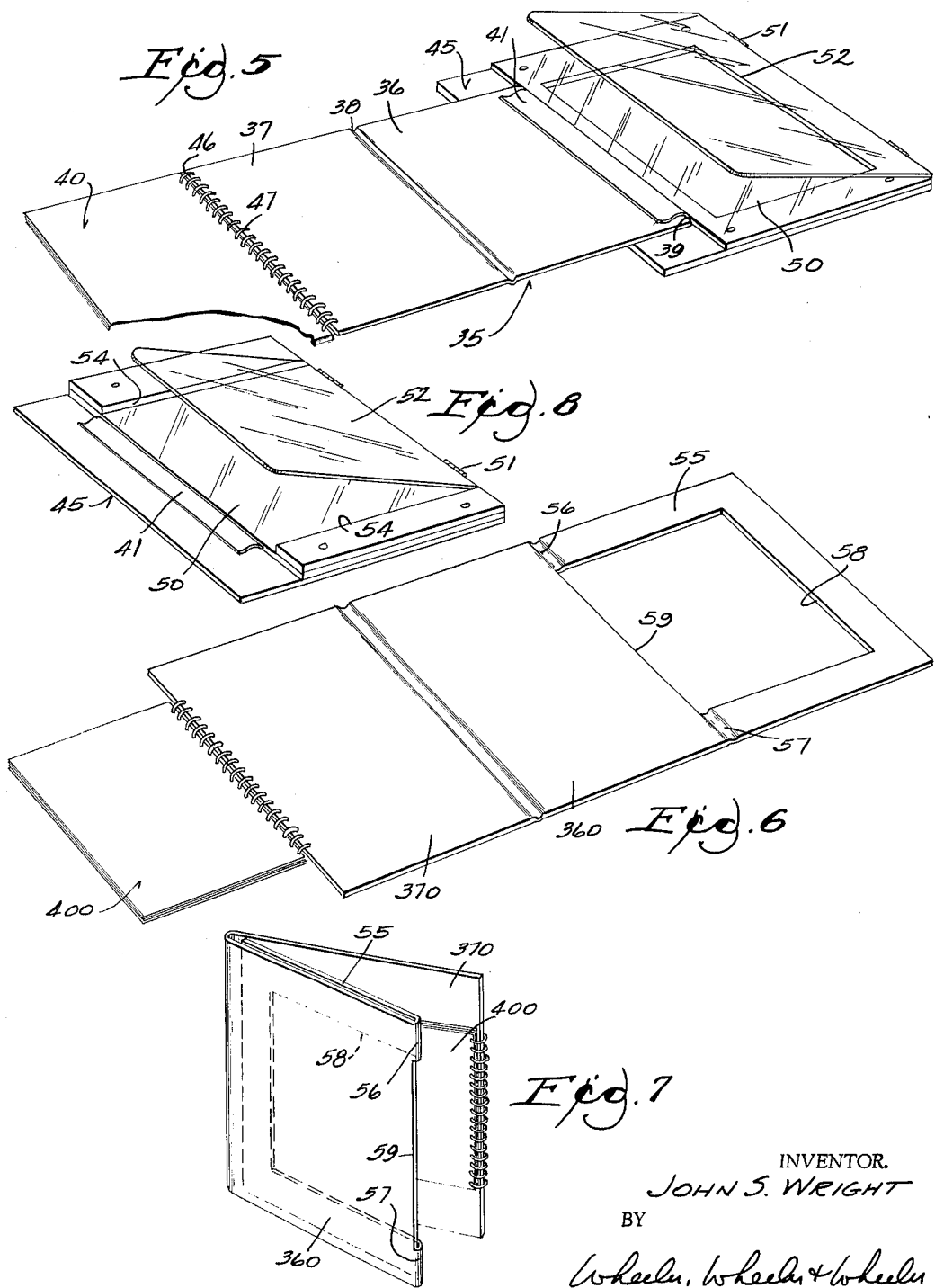
INVENTOR.
JOHN S. WRIGHT
BY
Wheeler, Wheeler & Wheeler
ATTORNEY United States Patent Office 3,253,358
Patented May 31, 1966

3,253,358
VISUAL TEACHING SYSTEM
John S. Wright, 627 Birch Ave., Whitefish Bay, Wis.
Filed July 17, 1963, Ser. No. 295,729
9 Claims. (Cl. 40—106.1)

This invention relates to transparency storage and changing equipment for an overhead projector or the like.

More particularly stated, this invention relates to portable or fixed attachments comprising changing and storage mechanism for transparencies designed to be used on overhead projectors, lightboxes and other similar devices.

There are two forms of the invention, one of which involves a separate frame equipped to position and to facilitate the use of a pack of transparencies in a book; and the other of which includes a framing device incorporated in a book of transparencies.

Broadly the object of the invention is to provide a book or pack of transparencies so hingedly related to the covers of the book as to provide, in conjunction with a framing device, simplicity and ease of manipulation of the pack. Another advantage concerns serial or cumulative visual effects due in part to the accuracy with which selected individual transparencies or groups of superposed transparencies from the pack may be placed singly or sequentially in viewing position.

Other objects and improved features will be apparent from the description below and from the drawings in which:

FIGURE 1 is a view in perspective of an overhead projector or light box with a book mounted pack of transparencies in position for successive or cumulative viewing.

FIGURE 2 is a perspective view of a slightly opened book and transparency pack embodying the form of the invention shown on the stage or table of the projector in FIGURE 1.

FIGURE 3 is a vertical section through the pack of transparencies and the book in which the transparencies are mounted as shown in FIGURE 1, but additionally including a framing device in such vertical section; a special cover glass shown in opened position in FIGURE 1 being shown in closed position in this FIGURE 3.

FIGURE 4 is an end view of the book shown in FIGURE 1, one cover being illustrated in an intermediate position in the course of withdrawing from the stage a transparency which has been exhibited thereon and is about to be stored between the covers.

FIGURE 5 is a perspective view of a pack of transparencies, a book for the storage or display of such transparencies and a holder for such a book and pack adapted to be positioned upon the stage or table of a projector.

FIGURE 6 is a perspective view similar in general to that shown in FIGURE 5, but showing a more economically produced embodiment of holder and framing device to be applied to the stage of the projector.

FIGURE 7 is a view similar to FIGURE 2, but showing the partially opened FIGURE 6 embodiment framing device and transparency pack.

FIGURE 8 is a perspective view of a modified form of a framing device having shoulders for centering the transparencies.

Somewhat diagrammatically, an overhead projector or "light box" is shown in FIGURE 1. Schematically illustrated are a light source 20 in a light-proof box 21, lenses 22 and 23, mirror 24, and a transparent stage or table 25 forming a part of the top of box 21. Light thus projected through transparent portion 26 of the table is intended to be passed through single or multiple pages or leaves of "transparencies" and to be then directed into a housing 30 held by overarm 31 in such position that an angularly disposed mirror 32 will project the light and image through a suitable lens at 33 for exhibition of the selected views upon a screen. The present invention concerns accurate presentation and proper storage and display of transparencies or packs of transparencies in book form relative to such a projector. While it is one of the advantages of the present equipment that it is usable with most projectors of the type indicated, it will be understood that there is nothing herein to preclude incorporating the disclosed device as a permanent part of such a projector.

Referring now to the preferred form of the invention as exemplified in FIGURES 1 to 5 inclusive, it will be seen that there is here provided a book 35 made up of two covers 36 and 37, respectively, hinged together at 38. Cover 36 functions primarily as a protective cover for a pack 40 of transparencies, but the cover also serves as a means for the accurate positioning of the pack and the respective transparencies, since the free margin 39 of cover 36 opposite the hinge 38 is receivable in a spring clamp 41 attached to frame 45, as will be described below.

Along the margin 46 of cover 37, which is remote from the hinge 38, the pack 40 and the individual transparencies forming it, are bound to cover 37 as shown clearly in FIGURE 5 by an appropriate form of ring binder 47 which accurately positions the pack and each individual transparency.

The framing device 45 may be made of any suitable material sufficiently rigid to rest in steady position on stage 25. As shown in FIGURE 3, the opaque material of the framing device is cut away to provide a window opening 48 to coincide with the opening 49 in the stage. The frame 45 is equipped with a transparent viewing table 50 registering with the stage and providing a supplemental support or auxiliary stage upon which individual transparencies or several superimposed transparencies are to be applied when an exhibition of transparencies is to be made. As clearly appears from the showing in FIGURE 3 and FIGURE 4, the transparent viewing table glass 50 is desirably materially thicker than the cover 36 so that when the cover 37 and ring binder 47 are in the position of FIGURE 3 the transparency 53 selected for display on the stage 50 will lie perfectly flat on the table glass.

Optionally the framing device 45 may also have in hinged relation thereto, as shown at 51, a transparent plane cover plate 52 of glass or plastic to hold down upon the transparent viewing table 50 an individual or series of transparencies as shown in FIGURE 3. This aids materially in obtaining even focusing of the desired image. It also is designed to be used for writing on and permits the operator to change or add to the projected image, without impairment of the transparency.

It is noteworthy that the loose leaf or ring binder attachment of the transparencies of pack 40 is not adjacent the hinge 38 between the two covers 36 and 37.

This ring binder is located on a free margin of cover 37 remote from the hinge but accurately positioned in reference to the hinge 38 so that the successive selection of individual transparencies such as 53 will, as shown in FIGURE 3, be presented in proper relationship to the stage opening 48.

Let it be assumed that a single selected film 53 has been exhibited by reason of its position upon plane table plate 50 in the path of light from source 20 projected through the lenses 22 and 23 and mirrors 21 and 52. Upon conclusion of the showing of film 53, the plate 52 may be swung about its hinge 51 to expose the transparency 53 which has been projected. The operator then hingedly raises cover 37 and the pack 40 of transparencies thereon and this withdraws from the display table the film or transparency 53. When the cover 37 is approximately vertical, the withdrawn transparency 53 will hang in substantial face contact with the cover or with previously stored transparencies. The operator will hold it in this position when the cover 37 and the remaining stack of transparencies 40 are returned to the position of FIGURE 3. When the cover 37 is returned to the position illustrated in FIGURE 3, the previously exhibited transparency 53 will be stored between covers 37 and 36 and the operator can then flip over into display positions the next transparency 53' from pack 40. Each successive transparency placed on the stage is accurately positioned in proper relationship to the framed opening at 48. If desired, the frame 45 may be formed with shoulders 54 to assist in centering each successive transparency thereon as shown in FIGURE 8.

It is contemplated that the transparencies may include related images so that the image of a successive transparency such as 53' may be superimposed on the image of the transparency 53 for a single exhibition. In that event, transparency 53' would be moved into operative position before transparency 53 is stored as above described. The two transparencies through which projection has occurred can then be stored together. The accuracy of positioning the transparencies which is the result of the arrangement of covers, hinges and binders shown in such as to make it entirely practicable to project the combined images of superposed transparencies.

Notes for guidance of an operator may be printed on portions of the transparencies or on separate sheets interleaved therewith as a part of the transparencies 40. In the latter case, the interleaved sheets of notes or lecture material would have to be flipped on top of the previously projected transparency before the cover 37 is manipulated to store the displayed transparency and the related notes.

In the alternative form of the invention shown in FIGURES 6 and 7, no separate frame of heavy material is provided, but material such as that of the covers 36 and 37 is used to provide a book frame 55 connected hingedly at 56–57. This extension cover provides a framed opening defined by the rectangularly disposed lines at 58 to overlie and coincide with the opening 26 in the stage 25. This means that a clamping device similar to clamp 41, fixed to a light box or overhead, would engage portion 59 of the outline of the frame 58 and thus accurately position the entire apparatus to the overhead or light box as shown in FIGURE 6. The device can also be simply taped to the light box or any projector. In this form of the invention, covers 360 and 370 are as long as the framing portion of cover extension 55. Therefore, the film pack 400 appears foreshortened as shown in FIGURE 6, but is actually of the same area as the film pack 40 shown in FIGURE 5. Here the book carries its own frame and the frame folds upon hinges 56–57 so as to be housed within the covers 360 and 370. This form of the invention can also have plate 52. The operation involved in the selection of individual transparencies is the same as that shown in FIGURE 4.

It will be understood that the plate 52 is available during the exhibition of a film or set of films for application of prompting material or for supplementing the disclosure upon the films.

I claim:

1. The combination with a stage having a window opening for the display of transparencies, of a book for the storage and display and manipulation of transparencies contained therein, said book comprising a first cover, means for connecting the first cover in predetermined relation to the stage with one side of such cover near the window opening, a second cover having means hingedly connecting it with the opposite side of the first cover, the second cover having a free margin normally adjacent the window opening and movable hingedly away from the stage, a pack of transparencies having means individually connecting them hingedly to the free margin of the second cover for movement from a first position on top of the second cover to a display position in registry with the window opening and from said display position to a stored position between said covers.

2. A combination according to claim 1 in which the stage includes a table glass at said opening and upon which successive transparencies rest when in display position in registry with the opening, such glass having its top face materially above the level of the top surface of the said first cover at its said one side which is near the window opening.

3. A combination according to claim 1 in which the means individually hingedly connecting the respective transparencies to the second cover comprises ring binder means.

4. A combination according to claim 1 in which the means for connecting the first cover with the stage comprises a spring clip detachably engaged with said first cover.

5. A combination according to claim 1 in which the means for connecting the first cover with the stage comprises a hinge, said stage comprising an accessory stage frame adapted to be hingedly folded upon said first cover.

6. A combination according to claim 1 in which the stage is an accessory for projecting equipment and is separately fabricated and freely movable and adapted to be superposed upon a conventional stage.

7. As an accessory for an overhead projector or the like with a lower light source, a supplemental stage frame provided with a table glass overlying the light source and having a clamping surface projecting laterally from the table glass, a set of hingedly bound transparencies having a cover, and means for clamping the cover to said surface, said means including a support projecting laterally along the said surface, means for connecting the support with said frame, and a hinged connection remote from the glass between the support and the cover, the cover having a free margin movable about its hinged connections with the support and to which the set of transparencies are hinged the set of transparencies including means for holding the transparencies bound to said cover while accommodating their movement individually to and from face contact with said glass.

8. An accessory according to claim 7 in which the frame further includes marginal shoulder means for accurately positioning successive transparencies on said glass.

9. An accessory transparency storage and display device for use with overhead projectors and the like, said device comprising a pair of covers having means hingedly connecting them with each other along corresponding margins, an opposite margin of one of said covers being free for movement with respect to the other cover, an extension hingedly connected with the free margin of said other cover and provided with a framing opening, a ring binder on the said free margin of said one cover, and a pack of transparencies mounted on said ring binder and projecting therefrom toward the means hingedly connecting said covers, said ring binder accommodating movement of successive transparencies around said free margin of said one cover from one side to the other of the said one cover and selectively registrable in their intermediate positions of hinged movement on the ring binder with the framing opening of said cover extension.

References Cited by the Examiner

UNITED STATES PATENTS

| | | | |
|---|---|---|---|
| 392,066 | 10/1888 | Rozall | 281—17 |
| 2,353,241 | 7/1944 | Hughey | 88—24 |
| 2,505,250 | 4/1950 | Kime | 40—152 |
| 2,602,253 | 7/1952 | Diamond | 40—106.1 |
| 2,779,116 | 1/1957 | Smith | 40—106.1 |
| 2,832,163 | 4/1958 | Jost | 40—158 |

FOREIGN PATENTS 25,547   12/1899   Great Britain.

EUGENE R. CAPOZIO, *Primary Examiner.*

JEROME SCHNALL, *Examiner.*

WENCESLAO J. CONTRERAS, *Assistant Examiner.*